United States Patent [19]
Casavant et al.

[11] Patent Number: 5,225,907
[45] Date of Patent: Jul. 6, 1993

[54] TELEVISION SIGNAL SCAN CONVERSION SYSTEM WITH REDUCED NOISE SENSITIVITY

[75] Inventors: Scott D. Casavant, East Windsor; Stuart S. Perlman, Princeton, both of N.J.

[73] Assignee: RCA Thomson Licensing Corporation, Princeton, N.J.

[21] Appl. No.: 857,899

[22] Filed: Mar. 26, 1992

[51] Int. Cl.$^5$ .............................................. H04N 7/01
[52] U.S. Cl. ................... 358/141; 358/140; 358/142; 358/167
[58] Field of Search ............... 358/141, 11, 140, 142, 358/166, 167, 36, 37, 105

[56] References Cited
U.S. PATENT DOCUMENTS

| | | | |
|---|---|---|---|
| 4,598,309 | 7/1986 | Casey | 358/11 |
| 4,931,855 | 7/1988 | Salvadorini | 358/142 X |
| 4,961,112 | 10/1990 | Sugimori et al. | 358/141 |
| 5,031,030 | 7/1991 | Hurst, Jr. | 358/142 |
| 5,068,728 | 11/1991 | Macovski | 358/142 X |

OTHER PUBLICATIONS

"A Decoder for Letterbox Type Wide Aspect EDTV System", preprint of paper presented at 133rd SMPTE Technical Conf., by Ito et al., Oct. 26-29, 1991.

*Primary Examiner*—Victor R. Kostak
*Attorney, Agent, or Firm*—Joseph S. Tripoli; Eric P. Herrmann; Ronald H. Kurdyla

[57] ABSTRACT

A television signal receiver processes a television signal representing a letterbox image display format with a main image region, and a bar region containing auxiliary "helper" information to help convert from interlaced to progressive scanning. In the presence of image motion, a main image component and the helper component are combined and conveyed to a video processor. In the absence of motion, other image information, e.g., field repeated information, is conveyed to the video processor. The information conveyed to the video processor is determined by a switching network responsive to an control signal from a motion detector which senses low frequency luminance image information substantially exclusive of high frequency image information.

6 Claims, 1 Drawing Sheet

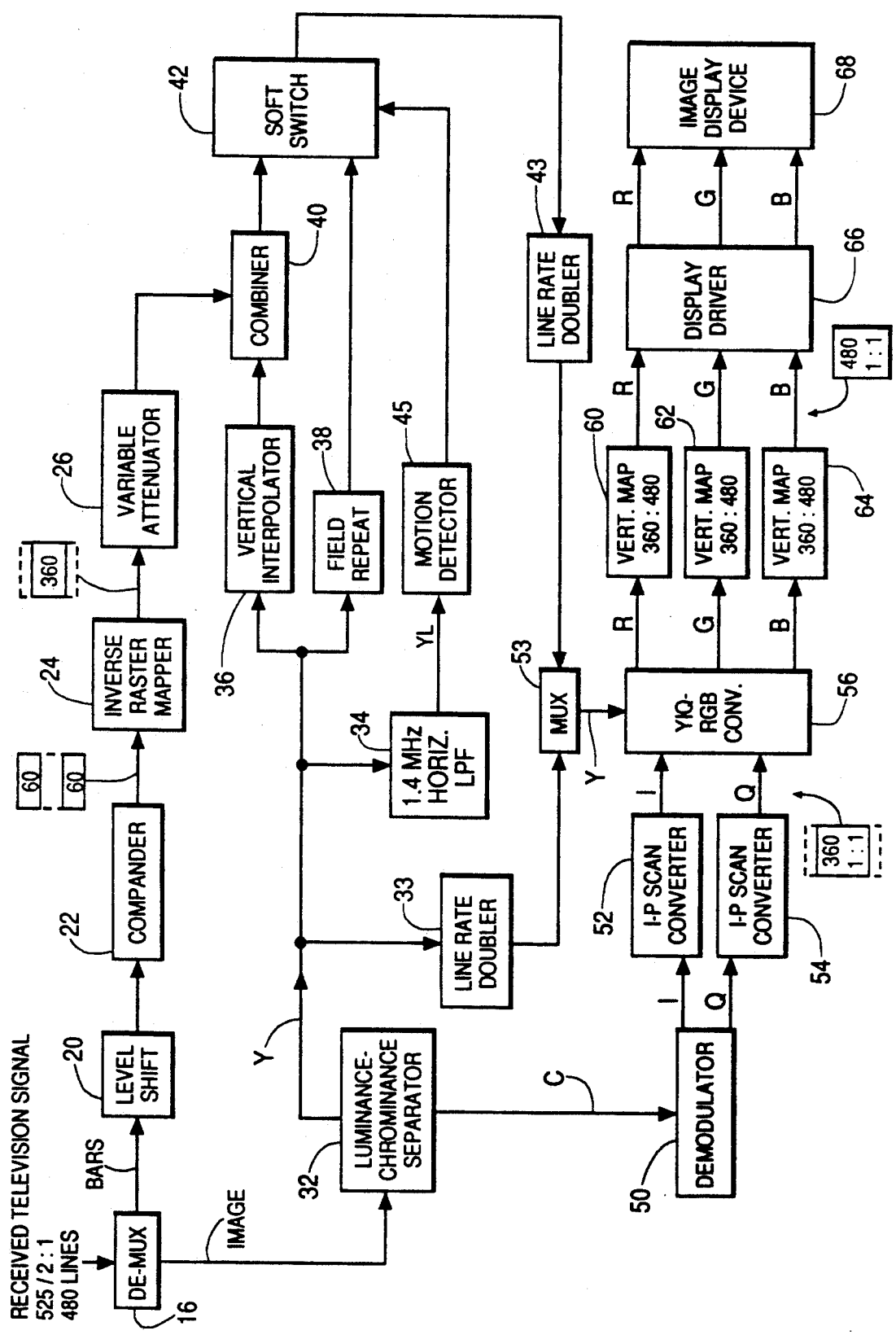

TELEVISION SIGNAL SCAN CONVERSION SYSTEM WITH REDUCED NOISE SENSITIVITY

FIELD OF THE INVENTION

This invention concerns a system for providing a so-called helper signal to facilitate converting a television signal from one image scanning format to another at a receiver, e.g., from interlaced to progressive scanning.

BACKGROUND OF THE INVENTION

A conventional television receiver, such as a receiver according to NTSC broadcast standards adopted in the United States and elsewhere, displays a line interlaced image with a 4×3 aspect ratio (the ratio of the width to the height of the displayed image). Recently, significant interest has developed concerning the use of enhanced image display formats including wider image aspect ratios, e.g., 16×9 or 5×3, and progressively scanned images.

Two prominent types of compatible wide aspect ratio (widescreen) television signal processing systems are the "side panel" system and the "letterbox" system. In the side panel system, left and right image side panels are spliced to a main image panel to produce a widescreen image with a 16×9 aspect ratio. One type of NTSC compatible enhanced definition widescreen system is described in U.S. Pat. No. 4,979,020 - Isnardi. The letterbox system is commonly used in Europe for television broadcasting of wide aspect ratio movies. In such case a standard 4×3 aspect ratio television receiver displays a wide aspect ratio (e.g., 16×9) with black bars appearing along the top and bottom edges of the displayed image. Although the side panel widescreen format avoids the black bars of the letterbox format, signal processing associated with the side panel format is more complex.

Both the side panel system and the letterbox system may display an image in 1:1 progressive scan (line sequential) format rather than 2:1 interlaced scan format to produce what is perceived as a higher resolution display. Often this involves converting a received interlaced image signal to a progressive scan image signal with the assistance of a so-called "helper" signal. For example, in the context of a compatible letterbox system, when the original (source) image information is in progressive scan format, a letterbox encoder subsamples the progressive scan image signal to create an NTSC compatible line interlaced signal for transmission to a standard receiver. The encoder also generates a vertical helper signal prior to subsampling to help convert the compatible letterbox coded interlaced signal back to the original progressive line scan format at a widescreen progressive scan receiver. The helper signal may be transmitted in the bar regions of the compatible letterbox coded signal. At a widescreen receiver, the helper signal recovered from the bar regions allows the widescreen receiver to recover vertical resolution that would otherwise be lost in the conversion cycle from progressive scan to interlaced scan, then back to progressive scan. Techniques for developing and using such helper signals are well known. To prevent the bar regions of a wide aspect ratio letterbox image displayed by a standard aspect ratio receiver from distracting a viewer, i.e., to reduce the visibility of the helper signal, the amplitude of the helper signal may be attenuated and shifted in a black image direction at the encoder to assure that the bar region appears black when displayed, for most if not all images. The helper signal is recovered at a widescreen receiver by performing the inverse of the attenuating and shifting operations performed at the transmitter/encoder.

It is herein recognized that a helper signal can be sufficiently degraded by noise, such as transmission channel noise for example, to adversely affect the quality of a reconstructed image displayed at a receiver. This is particularly likely to occur, for example, when the helper signal and the image signal are subjected to different types of signal processing. In the case of a letterbox system, it is recognized that channel noise is likely to adversely affect a helper signal compressed in the bar regions of a compatible letterbox television signal. A system according to the present invention reduces the effect of noise upon an image reconstructed in response to a helper signal subject to corruption by noise.

SUMMARY OF THE INVENTION

In a system according to the principles of the present invention, a received television signal contains an image component and an auxiliary component. The auxiliary component contains information to help construct an image with a desired image scanning format, and is subject to being corrupted by noise. In the presence of image motion, the image and auxiliary components are combined and conveyed to a video processor. In the absence of motion, other image information, e.g., field repeated image information, is conveyed to the video processor. The information conveyed to the video processor is determined by a control signal from a motion detector which senses low frequency image signal information substantially exclusive of high frequency image signal information.

In an illustrated embodiment, the received television signal is in letterbox format with an image region, and upper and lower bar regions containing the auxiliary information in compressed form. The auxiliary component helps to develop a progressive scan image, and the control signal is derived from a low pass filtered separated luminance component.

BRIEF DESCRIPTION OF THE DRAWING

The single FIGURE shows a portion of a wide aspect ratio television receiver for processing a letterbox-type television signal by means of apparatus according to the present invention.

DETAILED DESCRIPTION

A received NTSC compatible letterbox-type television signal exhibits a 525 line, 2:1 interlaced line scan format, with 480 image lines and a 4×3 aspect ratio. More specifically, the received television signal contains a central image component representing a central image region with 360 image lines, and upper and lower bar components each representing upper and lower bar regions and comprising 60 non-image lines, for a total of 480 lines. The televison signal is applied to a de-multiplexer 16 which separates the image and bar components.

The bar component from unit 16 is applied to a level shifter 20 in a helper signal processing path, including apparatus for recovering a vertical helper signal from the bar components. The vertical helper signal helps convert transmitted interlaced image information to original progressive scan form, and contains the difference between data discarded by a subsampling process at the transmitter/encoder and an estimate obtained from transmitted data. The helper signal is a low energy signal since in most cases this difference will be small. A simple helper signal (H) can be defined as $[(a+c)/2]-b$, where a, b and c are three vertically aligned pixels on three adjacent lines of an original progressive scan signal. At a receiver, pixels a and c are recovered together with helper signal H. Pixel b can be recovered by subtracting the helper signal from the average of pixels a and c, i.e., $[(a+c)/2]-H$.

In this example the helper signal has been mapped into the upper and lower bar regions of the letterbox signal. Thus three helper signal lines are mapped into one bar line. This is accomplished at a transmitter/encoder by horizontally subsampling (data compressing) the signal by a factor 3:1, followed by a "cut and paste" mapping process which moves the horizontally compressed helper signal information into the bar regions. Since the original helper signal information at the transmitter exhibited a nominal gray level, the helper signal had been non-linearly amplitude compressed and level shifted in a black image direction to reduce the visibility of helper signal information in the bar regions when the letterbox signal information is displayed by a standard aspect ratio NTSC receiver.

The bar component from unit 16 is applied to a level shifter 20 in the helper signal path for shifting the average level of the bars signal component back to its original gray level. An amplitude compander 22 expands the amplitude of the bars signal by the amount that the amplitude was compressed at the encoder, whereby the original dynamic range of the helper signal information is restored. A unit 24 performs inverse raster mapping of the bars signal. Specifically, unit 24 performs the inverse of the raster mapping operation performed at the encoder, using "cut and paste" processing to move the 3:1 data compressed helper signal information from the bar regions into the original vertical position in the image. Unit 24 includes an 8-point interpolator to expand the helper signal information horizontally by a factor of three to achieve full screen line width. At this point a reconstructed 360 line, full screen width helper signal is produced.

A low energy difference type vertical helper signal such as used in this example, usually has a magnitude in the vicinity of zero, and typically occupies ±10% of the full NTSC luminance range ($-40$ to 120 IRE), even for special images containing large amounts of vertical detail. Amplitude companders at the encoder (not shown) and decoder (unit 22) exhibit complementary non-linear $\mu$-law companding characteristics. The compander at the encoder amplitude compresses the helper signal with a relatively linear, low compression factor (e.g., less than four, typically unity) in the vicinity of zero amplitude where most of the helper signal information is expected. Low amplitude compression in this region enables signal values to be reconstructed accurately without significantly increasing the noise. The small amount of helper signal falling outside this region is subject to heavier, nonlinear compression.

Since most of the helper signal's dynamic range is subjected to little or no compression at the encoder, associated noise in this region of the helper signal is subjected to little or no enhancement when the amplitude of the helper signal is expanded by unit 22. However, at the encoder any large amplitude excursions of the helper signal are subjected to significant nonlinear compression, e.g., by a factor greater than four. Thus any noise which is associated with large amplitude excursions of the helper signal, or which is itself large enough to significantly increase the magnitude of a small helper signal, is greatly amplified when such amplitude excursions are expanded by unit 22 at the decoder. Such amplified noise undesirably appears in a decoded image as a noticeably bright or dark spot approximately three pixels wide resulting from the 1:3 horizontal expansion in unit 24. Thus although the non-linear companding action renders most of the helper signal less sensitive to noise, noise sensitivity may be increased under certain conditions as described.

A noise dependent variable attenuator 26 helps reduce the undesirable noise effects mentioned above. The gain of attenuator 26 is a function of the noise content of the received signal such that attenuator 26 exhibits substantially unity gain in response to a substantially noise-free input signal, and progressively smaller gain as input signal noise increases. Therefore in noisy conditions only a fraction of the helper signal is passed and eventually added to the image signal. The fraction of helper signal added is predetermined such that the amount of noise present in a displayed image is not expected to be objectionable. Attenuating the helper signal in this fashion is acceptable since any amount of helper signal will help reconstruct a progressive scan image signal with varying degrees of accuracy, and will generally produce a better result than not using a helper signal. Thus when the helper signal is corrupted by noise, whereby the reconstructed image is likely to contain objectionable bright/dark spots as explained, the amount of helper signal added to the image signal is reduced as determined by the amount of noise present.

Variable attenuator 26 can be made to operate as a function of noise level by employing well-known techniques. For example, attenuator 26 may include a keyed network for sampling the high frequency content of the luminance signal during a "quiet" portion of the vertical blanking interval to detect the presence of noise, a filter to develop a control voltage as a function of the magnitude of the noise-representative sampled output, and a gain control input responsive to the control voltage for adjusting the amount of attenuation as a function of the magnitude of the control voltage.

The image component from demultiplexer 16, containing the central 360 image lines, is separated into a chrominance component (C) and a luminance component (Y) via a luminance-chrominance separator 32, e.g., an adaptive luminance-chrominance separator of the line comb filter type. Briefly, unit 32 samples three vertically aligned pixels from three adjacent horizontal lines. Chrominance information is combed in accordance with a programmed algorithm to provide a combed chrominance output signal for each horizontal line. The combed chrominance signal is internally subtracted from the pre-combed signal to produce the combed luminance output signal, which is substantially devoid of chrominance information. The separated luminance component is vertically interpolated by a unit 36. Specifically, unit 36 vertically averages the lines immediately above and below the line being reconstructed in the current field. The helper signal from unit 26 is combined in unit 40 with the vertically averaged lines from unit 36 to produce a reconstituted luminance image signal. The helper signal contains the difference between the data that was discarded at the encoder and the data that was transmitted, and is added to the averaged image lines to develop the original luminance information.

A "soft" switch 42 receives the luminance image information from unit 40 at one input, and field repeated luminance information from a unit 38 at another input. Unit 38 may include a field storage memory device. Unit 38 produces an output signal containing luminance information in which missing lines are obtained from, i.e., repeated form, the previous field. Thus the output signal from unit 38 includes, sequentially, line information from the current field followed by line information from the previous field, and so on. The operation of switch 42 is controlled by a control signal from a motion detector 45. Motion detector 45 senses low frequency image information associated with a low frequency luminance signal YL (approximately 0–1.4 MHz), exclusive of high frequency information including chrominance information, for detecting the presence or absence of image motion. Signal YL is derived from the separated luminance component by means of a horizontal low pass filter 34. The relative amounts of combined signal from unit 40 and signal from unit 38 is a function of the value of the control signal from motion detector 45. One extreme value of the control signal represents a moving image, in which case a reconstructed progressive scan luminance signal for the current field appears at the output of switch 42. The other extreme value of the control signal represents a motionless image, in which case the output signal from unit 38 appears at the output of switch 42. Intermediate values of the control signal cause predetermined portions of combined or field repeated luminance signals to appear at the output of switch 42. The cut-off frequency of filter 34 can be decreased, or increased, e.g., to 4.0 MHz, as required by the needs of a particular system to reduce the effects of noise.

The system as described so far advantageously reduces the likelihood that the reconstruction of a progressive scan luminance signal will be adversely affected by noise. Noise can cause a motion detector to falsely indicate the presence of motion, particularly in still image areas. Sensing low frequency luminance information by motion detector 45 advantageously reduces the likelihood that motion detector 45 will be influenced by noise to provide a false indication of motion, and that switch 42 will improperly provide an output signal from combiner 40 including a possible noise contaminated helper signal. The disclosed sensing arrangement also reduces the likelihood that chrominance information, which may resemble noise, will produce a false output from motion detector 45 particularly in the presence of a still image.

The separated chrominance component (C) from unit 32 is applied to a chrominance demodulator 50 of conventional design for recovering the "I" and "Q" color difference components. Units 52 and 54 convert these components to progressive scan form by vertically averaging adjacent horizontal lines. A unit 56, e.g., a matrix network, responds to the I, Q, signals from units 52 and 54 and to the luminance output signal from switch 42 for developing image representative red, green and blue signals R, G, B. The luminance (Y) input to unit 56 is a progressive scan luminance signal provided by a time multiplexer (MUX) 53. One input of MUX 53 receives a line rate doubled ("real") luminance signal via a line doubler 33 and the output of separator 32. Another input of MUX 53 receives a line rate doubled interstitial line luminance signal via a line doubler 43 and the output of switch 42. Vertical raster mappers 60, 62 and 64 include interpolators for vertically expanding the reconstructed 360 line R, G, B image signals to full 480 image line display screen height. The R, G, B signals from units 60, 62 and 64 are each a 525 line, progressive scan, 480 image line signal, and are applied via a display driver 66 to an image display device 68 (e.g., a color kinescope).

What is claimed is:

1. A system for receiving a television signal containing image information and a bar region containing auxiliary information to help construct an image with a desired display scanning format, said receiving system including
    an image path for processing said image information;
    an auxiliary path for processing said auxiliary information;
    means for combining output signals from said main and auxiliary paths to produce an output signal;
    video signal processing means;
    means for deriving a motion representative control signal from image information; and
    means responsive to said derived control signal for providing to said video signal processing means (a) said output signal from said combining means in the presence of image motion and (b) repeated image information in the absence of image motion, wherein for enhancing the noise immunity of said system, said control signal is derived from low frequency image information substantially exclusive of high frequency image information.

2. A system according to claim 1, wherein
    said television signal represents a letterbox image display format having an image region containing said image information and a bar region containing said auxiliary information.

3. A system according to claim 1, wherein said control signal from said deriving means is derived from low frequency luminance information of a separated luminance component substantially exclusive of chrominance information.

4. A system according to claim 1 and further including
    means for amplitude expanding said auxiliary information prior to said combining means.

5. A system according to claim 1, wherein said providing means includes
    motion detector means responsive to said control signal; and
    switch means having an input for receiving said output signal from said combining means, an input for receiving said repeated image information, and a control input for receiving said control signal.

6. A system according to claim 5, wherein
    said output signal from said combining means comprises vertically averaged image information.

* * * * *